Nov. 11, 1930.  E. MAYMAN  1,781,291
AUTOMATIC CONTROL FOR AIRPLANE FLOTATION APPARATUS
Filed Jan. 7, 1930

INVENTOR.
EDWIN MAYMAN
BY
A. B. Bowman
ATTORNEY.

Patented Nov. 11, 1930

1,781,291

UNITED STATES PATENT OFFICE

EDWIN MAYMAN, OF SAN DIEGO, CALIFORNIA

AUTOMATIC CONTROL FOR AIRPLANE FLOTATION APPARATUS

Application filed January 7, 1930. Serial No. 419,172.

My invention relates to automatic controls for airplane flotation apparatus, and the objects of my invention are: first, to provide a control of this class which automatically operates the conventional emergency flotation apparatus used to support airplanes on water; second, to provide a control of this class which operates by water pressure on a certain portion thereof; third, to provide a control of this class which does not operate until after the airplane has struck the water and its motion considerably retarded, thus delaying the operation of the flotation apparatus until a time when it may open without danger of being torn and rendered ineffective; fourth, to provide a control of this class which is particularly adapted to act should the pilot become unconscious or otherwise unable to operate the manual controls for the flotation apparatus, thereby decreasing the risk of losing the airplane or causing injury or death to the persons riding therein; fifth, to provide a control of this class which, though readily operated by water pressure, but which is practically impossible to accidentally operate should the airplane make a poor landing or be otherwise jarred; and, sixth, to provide a control of this class which is extremely light of construction, readily installed in practically any out of the way portion of the fuselage or wing, positive in its action, and which will not readily deteriorate or get out of order.

Figure 1:
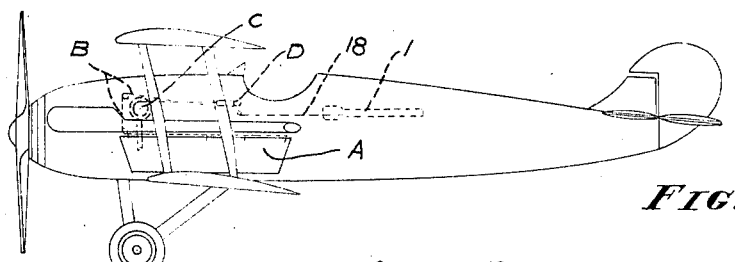
Figure 2:
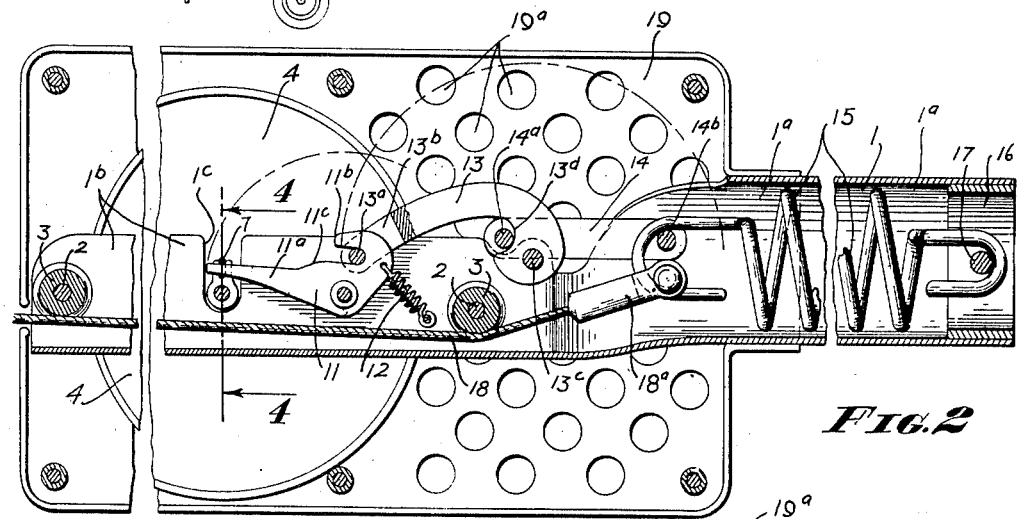
Figure 3:
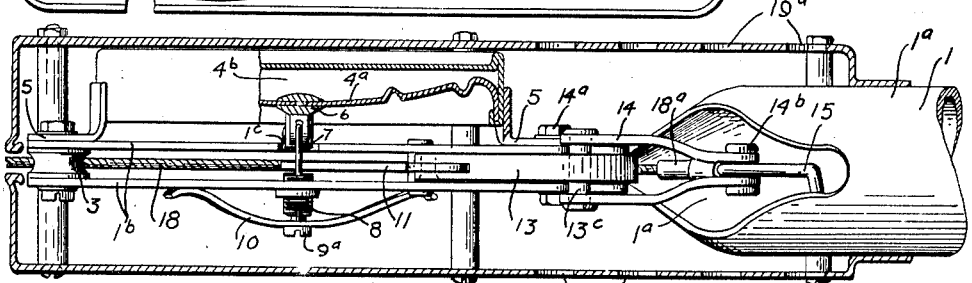
Figure 4:
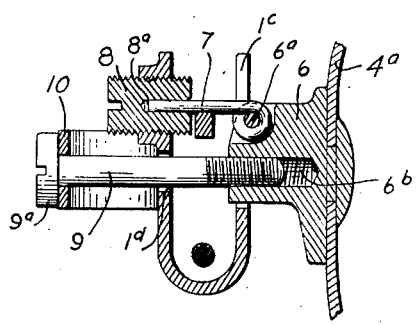

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon, which form a part of this application, in which:

Figure 1 is a side elevational view of an airplane, showing by dotted lines the relation of my flotation apparatus control thereto; Fig. 2 is an enlarged, fragmentary, sectional view of the controls taken substantially through 2—2 of Fig. 3; Fig. 3 is another fragmentary, sectional view at right angles to Fig. 2, taken through 3—3 of Fig. 2; and Fig. 4 is an enlarged, fragmentary, cross sectional view through 4—4 of Fig. 3.

Similar characters of reference refer to similar parts and portions throughout the several views of the drawings.

Body member 1, spacers 2, tie bolts 3, diaphragm member 4, supports 5, boss 6, locking pin 7, keeper 8, tension screw 9, tension spring 10, cam lever 11, cam lever spring 12, release arm 13, link member 14, spring 15, spring anchor sleeve 16, spring anchor 17, control cable 18, and housing members 19 and 20 constitute the principal parts and portions of my automatic control for aircraft flotation apparatus.

The body member 1 comprises a tubular portion $1^a$ and a channel portion $1^b$ extending therefrom and integral therewith. The side walls of the channel portion $1^b$ are held apart by spacers 2, which are held by tie bolts 3. Near the extended end of the channel portion $1^b$ is a diaphragm member 4 which is mounted on the outer side of the channel portion $1^b$ by means of supports 5 secured to said channel portion.

The diaphragm member 4 is provided with a diaphragm portion $4^a$, the axis of which is positioned transversely to the side wall of the channel $1^b$ so that it moves to and from the said side wall, as shown best in Figs. 3 and 4. The diaphragm portion $4^a$ forms the movable wall of the chamber $4^b$ from which the air is partially exhausted. Centered on the diaphragm portion $4^a$ is a boss portion 6 which extends toward the channel portion $1^b$. The nearest wall of the channel portion $1^b$ is provided with a notch $1^c$ therein so as to clear the boss 6.

Hinged between a bifurcated portion $6^a$ of the boss 6 so as to rotate in a vertical plane, is a locking pin 7, which extends transversely relative to the channel portion $1^b$ to the side wall thereof furthest from the diaphragm portion $4^a$. The extended end of the pin 7 fits into a socket $8^a$ of a keeper 8.

The keeper 8 is in the form of an externally threaded set screw which is adapted to be screw-threaded into an opening provided in the wall of the channel portion $1^b$ adjacent the end of the keeper 8, as shown best in Fig. 4.

The boss 6 is provided with an internally threaded socket $6^b$ positioned in substantially centered relation to the diaphragm portion $4^a$. The socket $6^b$ receives an end of a tension screw 9 which extends outwardly from the boss 6 through an opening $1^d$ in the opposite side wall. Supported between the head $9^a$ of the tension screw and the nearest side wall of the channel portion $1^b$ is a tension spring 10, which, by adjusting the screw 9, regulates the pressure necessary for the operation of the diaphragm $4^a$. Inward movement of the diaphragm, that is, movement thereof away from the channel portion $1^b$, causes the pin 7 to withdraw from the socket $8^a$ in the keeper 8.

Mounted rearwardly of the pin 7, that is, towards the tubular portion $1^a$, between the side walls of the channel $1^b$, is a rotatable cam lever 11. The lever 11 is provided with a forwardly extending arm $11^a$, which passes underneath the pin 7, as shown in Figs. 2 and 4.

A spring 12 is connected to the cam lever 11 in such a manner as to raise the arm $11^a$ against the under side of the pin 7 so that said pin restrains the cam lever and prevents its rotation in a clockwise direction.

Above the point of support of the cam lever 11 is formed a hook portion $11^b$ open towards the arm $11^a$, which receives a pin $13^a$ extending between the bifurcated ends $13^b$ of a release arm 13. The upper surface of the arm $11^a$ adjacent the notch $11^b$ forms a cam surface $11^c$, which engages the pin $13^a$ as the cam lever 11 rotates and raises the arm of the bifurcated end $13^b$ of the release arm 13.

The release arm 13 is rotatably supported rearwardly of the lever 11 upon a pin $13^c$ extending between the side walls of the channel portion $1^b$. The pin $13^c$ is mounted rearwardly of the cam lever 11 in substantially horizontal relation with the pin $13^c$ connecting the bifurcated ends $13^b$ of the release arm.

Slightly above and forwardly of the pin $13^c$ the release arm 13 is provided with a rearwardly extending notch portion $13^d$ which opens towards the forward end and which receives the forward end of a link member 14. The link member 14 is in the form of a pair of spaced apart, rearwardly extending members connected at their forward and rear ends by pins $14^a$ and $14^b$, respectively.

Just rearwardly of the pin $13^c$, the channel $1^b$ is wide and merges into the tubular portion $1^a$. The rear ends of the link members 14 extend into the tubular portion $1^a$ and are connected to a hooked forward end of a spring 15. At the rear end of the tubular portion $1^a$, there is provided a reinforcing sleeve 16, through which extends a spring anchor 17, around which is hooked the other end of the spring 15. The tubular portion $1^a$ is relatively long so that the spring may have considerable movement.

Connected to the forward end of the spring 15 by means of a yoke $18^a$, is a control cable 18, which extends forwardly through the channel portion $1^b$ along the lower sides thereof. The cable is held away from the cam lever 11 and other mechanisms mounted within the channel portion $1^b$ by means of the spacers 3, as shown best in Fig. 2.

The diaphragm 4, channel portion $1^b$, and mechanism supported thereby are covered by housing members 19 and 20, which are made of light material and are preferably formed in halves, one complementing the other. The rear end of the housings 19 and 20 are secured by means of a sleeve portion to the forward end of the tubular portion $1^a$, as shown in Figs. 2 and 3. The housing members 19 and 20 are made large enough to clear the mechanism and are provided with a plurality of perforations $19^a$ and $20^a$, which readily admit water into contact with the diaphragm 4. The holes $19^a$ and $20^a$ are so positioned that the mechanism cannot be accidentally engaged and cause unwanted operation of the control.

The usual flotation apparatus used in connection with airplanes consists of one or more collapsible bags mounted in their folded positions, in containers A supported along the sides of the fuselage or in the wings of the airplane. The containers are readily opened by the rip cords B, which release the flotation bags therein. The rip cords are also connected to a valve C of a bottle containing liquid carbon dioxide. In the usual arrangement, the flotation apparatus is operated by pulling a handle D mounted within reach of the pilot, as shown in Fig. 1. With my device this same mechanism is retained, but the cable 18 is secured at some point between the handle of the flotation apparatus and the mechanism operated thereby.

As shown in Fig. 1, my control may be mounted in the fuselage, just rear of the cockpit. It may just as readily be mounted in the wing or in any other suitable relation to the flotation apparatus.

The operation of my control is as follows: As soon as the airplane has sunk sufficiently in the water for water to act upon the diaphragm, the diaphragm 4 withdraws the pin 7 from its keeper 8, which releases the cam lever 11, permitting the same to rotate in a clockwise direction and disengage the release arm 13. Rotation of the release arm 13 in turn releases the link member 14, and thereby releases the spring 15. The spring then moves to its normal position pulling with it the cable 18, which in turn operates the flotation apparatus in the same manner as the usual manual control.

It can be seen that with this arrangement, should it be desired to use the manual control and not rely on the automatic control, it may be operated in the usual manner and the action of my control thereby rendered inoperative.

Though I have shown and described a particular construction, combination and arrangement of parts and portions, I do not wish to be limited to this particular construction, combination and arrangement, but desire to include in the scope of my invention the construction, combination and arrangement of parts and portions substantially as set forth in the appended claims.

Having thus described my invention, what I claim as new and desire to secure by Letters Patent is:

1. In an automatic control for aircraft flotation apparatus, a body member, a spring secured at its one end thereby, a mechanism supported by said body member arranged to hold said spring in its distorted position, a pressure actuating means and means operated thereby for releasing the hold of said mechanism upon said spring, and a cable connecting said spring with the draw cable of a flotation apparatus.

2. The combination with an aircraft having a flotation apparatus, of a body member supported by the frame portion of said aircraft, a spring secured at its one end in said body member, lever and link means supported by said body member arranged to hold said spring in its distorted position, a pressure actuated mechanism, and means operated thereby for releasing the hold of said link and lever mechanism upon said spring, and a cable connected to said spring arranged to be withdrawn thereby when said spring is released, said cable connected with the draw cable of said flotation apparatus.

3. The combination with an aircraft having a flotation apparatus, of a body member secured to the framework of said aircraft, a spring secured at its one end in said body member, a first lever releasably supporting the other end of said spring, a second lever interlocking with the free end of said first lever, a pressure actuated diaphragm, a pin pivotally supported thereby arranged to engage the free end of said second lever, a keeper for holding said pin, said diaphragm adapted to withdraw said pin from said keeper upon submersion in a liquid whereby said levers release said spring, and a cable attached to said spring so as to be drawn thereby, said cable connected to a draw cable of said flotation apparatus.

4. The combination with an aircraft having a flotation apparatus, of a body member comprising a tubular portion and a channel portion at the one end thereof, an anchor means at the end of said tubular portion most remote from said channel portion, a spring supported at its one end by said anchor, link and lever means supported in said channel portion arranged to releasably hold the other end of said spring, a pressure actuated means for releasing the hold of said mechanism upon said spring, and a cable connecting said spring with the draw cable of the flotation apparatus, whereby said cable is moved with said spring upon release of said link and lever means.

5. The combination with an aircraft having a flotation apparatus, of a body member comprising a tubular portion and a channel portion at the one end thereof, an anchor means at the end of said tubular portion most remote from said channel portion, a spring supported at its one end by said anchor, a lever means supported at the other end of said spring, whereby the force of said spring pulls in slight offset relation to the dead center of said lever, a second lever releasably engaging the free end of said first lever, a diaphragm member supported by said body member, catch means engaging the free end of said second lever, said catch means releasable by the action of said diaphragm member, whereby said first lever releases said second lever and causes said second lever to release said spring, and a cable drawn by said spring and connected with the draw cable of said flotation apparatus.

6. In a device of the class described, the combination with an aircraft having an emergency flotation apparatus, of a body member supported by the frame of said aircraft, a spring mounted in said body member, a cable shiftable with said spring and connected in operative relation to said flotation apparatus, retaining means holding said spring in its distorted position, a diaphragm means arranged to collapse when submerged in water, and trip means shiftable with said diaphragm means for releasing said retaining means whereby said spring shifts to its normal position.

7. In a device of the class described, the combination with an aircraft having an emergency flotation apparatus, of a body member supported by the frame of said aircraft, a spring mounted in said body member, a cable shiftable with said spring and connected in operative relation to said flotation apparatus, retaining means holding said spring in its distorted position, a diaphragm means arranged to collapse when submerged in water, and trip means shiftable with said diaphragm means for releasing said retaining means whereby said spring shifts to its normal position, and a perforate cage shielding and protecting said retaining means and diaphragm from accidental operation.

8. In a device of the class described, the combination with an aircraft having emergency flotation apparatus, of a shifting means, a cable connecting said shifting means to the operating cord of said flotation apparatus, a retaining mechanism for holding said shifting means in an abnormal position, a diaphragm means collapsible upon submersion in water, and trip means shiftable with said diaphragm means for releasing said shifting means from said retaining mechanism, whereupon said shifting means returns to its normal position.

In testimony whereof, I have hereunto set my hand at San Diego, California this 28th day of December 1929.

EDWIN MAYMAN.